PIER-LUIGI FOCARDI.
BALL BEARING.
APPLICATION FILED JULY 23, 1915.
1,210,921.
Patented Jan. 2, 1917.
2 SHEETS—SHEET 1.
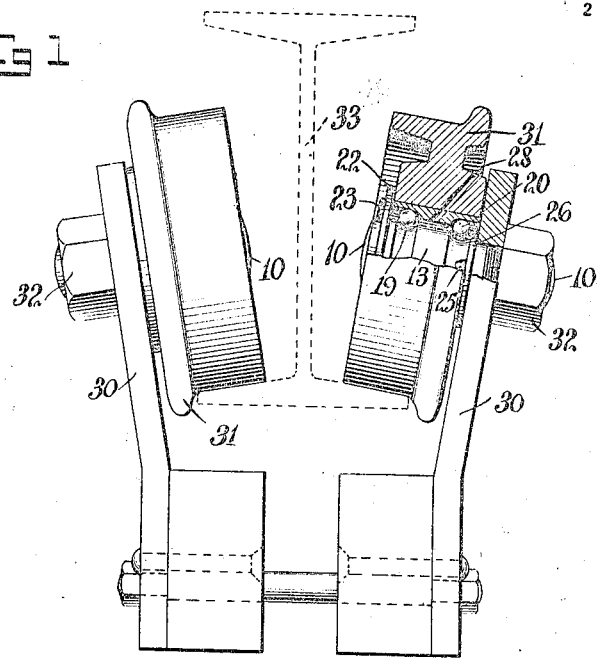
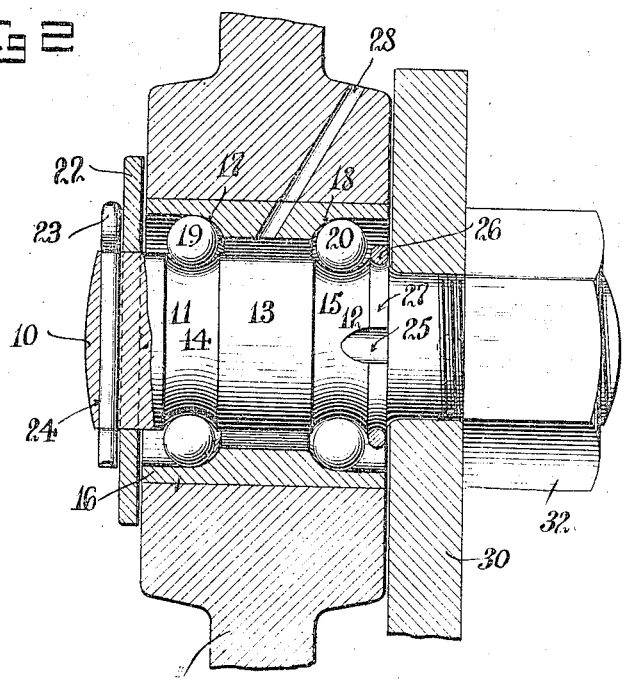
Witness
C. J. Hachenberg
Inventor
Pier-Luigi Focardi
By Mitchell & Allyn
Attorney PIER-LUIGI FOCARDI.
BALL BEARING.
APPLICATION FILED JULY 23, 1915.
1,210,921.
Patented Jan. 2, 1917.
2 SHEETS—SHEET 2.
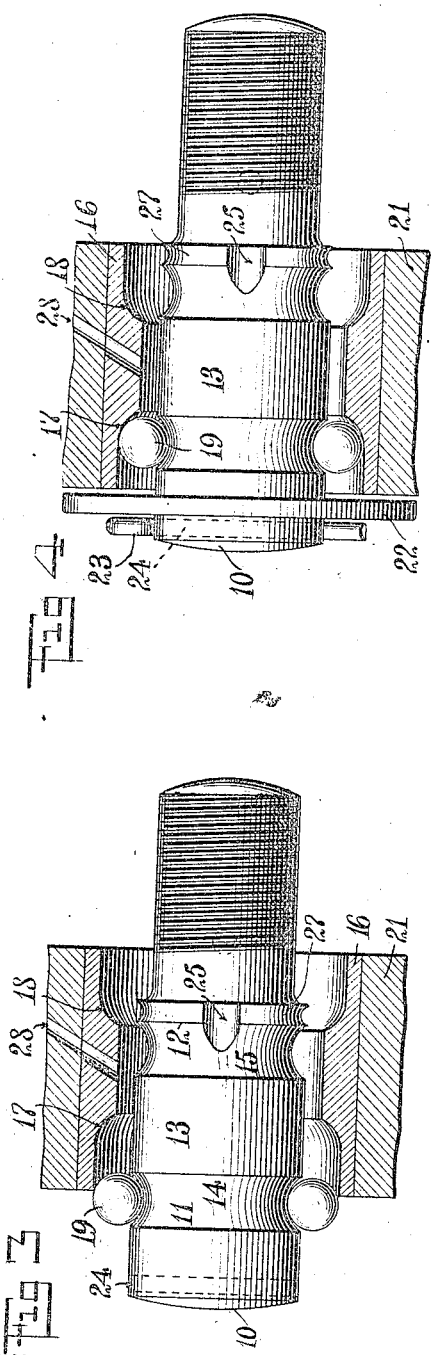
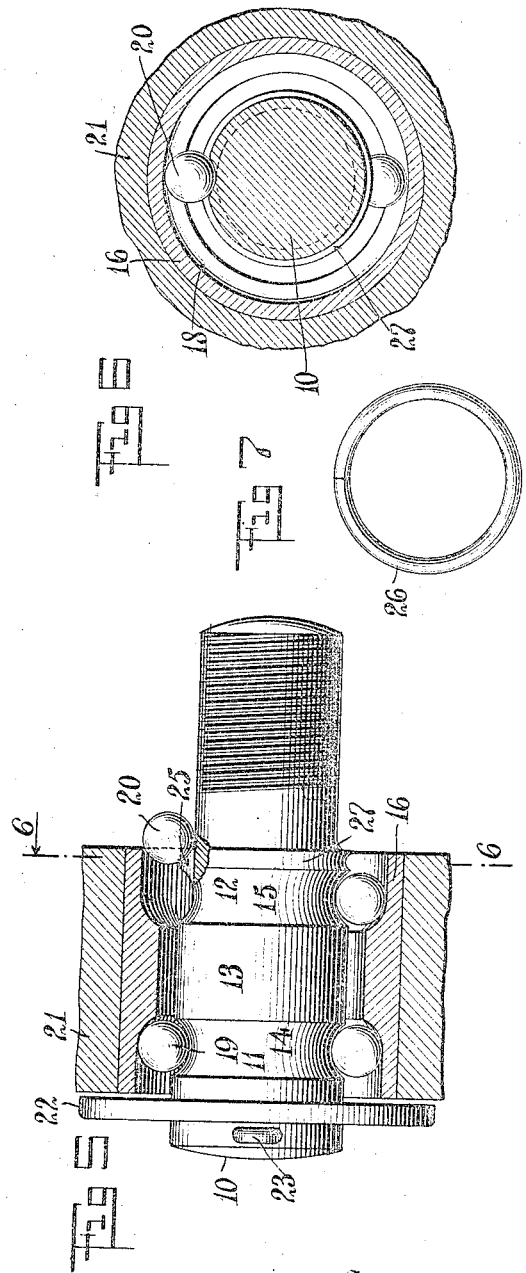
Witness
C. J. Hachenberg
Inventor
Pier-Luigi Focardi
By Attorney

UNITED STATES PATENT OFFICE.

PIER-LUIGI FOCARDI, OF BROOKLYN, NEW YORK, ASSIGNOR TO GARWOOD COMPANY, OF GARWOOD, NEW JERSEY, A CORPORATION OF NEW JERSEY.

BALL-BEARING.

1,210,921.

Specification of Letters Patent.     Patented Jan. 2, 1917.

Application filed July 23, 1915. Serial No. 41,437.

*To all whom it may concern:*

Be it known that I, PIER-LUIGI FOCARDI, a citizen of the United States of America, residing at Brooklyn, Kings county, State of New York, have invented a new and useful Ball-Bearing, of which the following is a specification.

The main object of my invention is to provide a simple durable and relatively inexpensive construction.

A special object is to provide a construction which will carry considerable weight.

One field in which the construction has been tried with great success is that of large capacity conveying trolleys.

The invention is illustrated as applied to such a use, but it will be understood that it is not limited to any special field. In the form shown and described herein, the axle is provided with two ball races, and the rotating member is provided with a bushing which furnishes the opposite walls for the series of balls. The outer wall of the inner race-way in the axle is provided with a notch for the insertion of balls into said race-way. The parts may be held together by securing the axle to a support. A washer may be provided for the outer end of the axle and a guard ring for the inner end of the axle.

The details of construction and the method of assembling will be understood hereinafter.

Figure 1 illustrates a ball bearing as applied to a conveyer trolley, one of the wheels and part of the bearing being shown in section. Fig. 2 is a larger sectional view showing the assembled bearing. Fig. 3 is a similar view showing the first step in the assembling of the bearings, the balls being inserted in the outer race-way. Fig. 4 is a similar view with the axle in place in the bushing. Fig. 5 is a similar view showing the insertion of the balls in the inner race-way. Fig. 6 is a sectional view on the plane of the line 6—6 of Fig. 5. Fig. 7 shows the retaining ring.

The axle 10 or shaft member is provided with outer and inner bearing faces 11 and 12 facing toward each other forming raceways. These race-ways may be formed by cutting grooves in the axle so as to leave an enlarged part 13 of the axle with the oppositely inclined faces 14—15.

The bushing 16 surrounds the axle and is provided with oppositely inclined bearing faces 17—18 for the series of balls 19 and 20, respectively. This in effect, provides outwardly opening race-ways in the opposite ends of the bushing. The bushing is secured in the hub 21 or other part.

A washer 22 may be provided at the outer end of the axle and held in place by a cotter pin 23 in a hole 24 in the axle. The inner bearing face 12 on the axle is provided with a notch or slot 25 to permit the balls of the inner row to be inserted. The split spring ring 26 is adapted to fit in a groove 27 of the axle to hold the balls in place after assembling. The bearing may be lubricated through the passage 28 leading through the hub 21 and the bushing 16.

As before mentioned, I have illustrated the invention as applied to a conveyer trolley bearing. The arm 30 constitutes the support for the axle 10 and the wheel 31. What may be termed the inner end of the axle is screw-threaded for the nut 32 for holding the parts together. In this case the wheels are designed to run on the oppositely inclined flanges of an I-beam 33 and the axles of the wheels are accordingly inclined. It will be noted that this brings a peculiar strain upon the bearing which is obliged to withstand longitudinal as well as transverse pressure. This bearing is peculiarly adapted to withstand just such strain.

To assemble the parts, the bushing 16 is inserted in the hub 21 and the axle 10 is inserted in the bushing. The balls 19 are then inserted in the outer race-way and the axle pushed into the position shown in Fig. 4. The washer 22 is then put on and the cotter 23 inserted. The washer assists in holding the hub in place on the bushing and also prevents the entrance of dirt and dust. The inner series of balls 20 is then inserted through the notch 25, one at a time, as shown in Fig. 5, and the ring 26 is snapped in place in the groove 27 to prevent the balls from coming out. The axle is then inserted in the support 30 and secured by the nut 32. By reversing the operation, the parts may be readily disassembled. This construction permits of a wide spread between the row of balls giving a great stability to the bearing, and it permits of a relatively small outside diameter for the outer bushing for a given size of balls and axle, as there is no inner bushing. A relatively large axle may be used for a given outside diameter of the outer bushing. The space between the outer bushing and the axle may be used as a reservoir for a suitable lubricant such as vaseline, and also as a distributing chamber for oil squirted through the oil hole 28.

The particular advantages of the invention reside in the simplicity and inexpensive construction which can be readily assembled or disassembled, and which is capable of supporting heavy loads under severe conditions of use.

Although the form shown has been found practical and commercially desirable, it should be understood that the invention is not limited to details except by the scope of the claims and the state of the art.

What I claim is:

1. In a construction of the character described, an axle threaded to provide a shank portion at one end and grooved at its opposite end portion to provide ball tracks facing toward each other, said axle having a shoulder thereon adjoining the ball track adjacent to the shank portion of the axle and cut through to the ball track to provide an entrance notch for the balls, a wheel engaged over the grooved portion of the axle and provided with oppositely facing ball tracks confronting the ball tracks on the axle, balls engaged between the confronting sets of ball tracks, a support receiving the shank portion of the axle and covering the entrance notch and a nut engaged on the threaded end of the axle and clamping the shoulder thereon in rigid engagement with the support.

2. In a trolley bearing of the character described, the combination of an inclined axle having ball bearing tracks facing toward each other and arranged on different levels, said axle having an entrance notch extending through a part of the lower track, a wheel having tracks facing opposite to the tracks on said axle, the tracks in said wheel both opening toward the outer faces of said wheel, two sets of balls in said track-ways, a supporting arm secured to the lower end of said axle and covering said entrance notch and a washer on the upper free end of said axle covering the entrance to the upper set of balls, all whereby said bearing is subjected to vertical and horizontal pressure.

PIER–LUIGI FOCARDI.